United States Patent
Nepustil

(10) Patent No.: US 6,240,454 B1
(45) Date of Patent: May 29, 2001

(54) DYNAMIC RECONFIGURATION OF NETWORK SERVERS

(75) Inventor: Vladimir Nepustil, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 08/711,189

(22) Filed: Sep. 9, 1996

(51) Int. Cl.[7] .............................. G06F 9/00; G06F 15/16; G06F 15/173
(52) U.S. Cl. ........................... 709/229; 709/105; 709/239
(58) Field of Search ............................ 395/675; 709/105, 709/104, 239, 228, 229, 203

(56) References Cited

U.S. PATENT DOCUMENTS

| | | | |
|---|---|---|---|
| 5,548,724 | * 8/1996 | Akizawa et al. | 395/200.03 |
| 5,633,999 | * 5/1997 | Clowes et al. | 714/6 |
| 5,818,448 | * 10/1998 | Katiyar | 345/335 |
| 5,828,847 | * 10/1998 | Gehr et al. | 709/239 |
| 5,835,718 | * 11/1998 | Blewett | 709/218 |
| 5,862,348 | * 1/1999 | Pedersen | 709/229 |
| 5,894,554 | * 4/1999 | Lowery et al. | 707/10 |
| 5,918,013 | * 6/1999 | Mighdoll et al. | 709/217 |
| 6,097,882 | * 8/2000 | Mogul | 395/200.31 |

FOREIGN PATENT DOCUMENTS 0648038    4/1995   (EP) .

OTHER PUBLICATIONS

Adler, R.M., "Distributed Coordination Models for Client/Server Computing", vol. 28, No. 4, Apr. 1, 1995, pp. 14–22.

A. Gaffin, *Netscape Readies Replication Technology*, Network World, vol. 13, No. 15, Apr. 8, 1996, p. 8.

* cited by examiner

Primary Examiner—Larry D. Donaghue
(74) Attorney, Agent, or Firm—David Volejnicek

(57) ABSTRACT

One or more portions (221) of a database (220) which a primary server (106) uses to process client requests are duplicated (211) on one or more supplemental servers (105). As the clients demand for service increases and the processing load on the primary server becomes excessive (400), the primary server automatically off-loads the processing of those portions of the client requests that require one or more of the duplicated portions onto the supplemental servers by substituting (402) a secondary page (253) or a secondary object in its database that points to the one or more duplicated portions in the supplemental servers for a corresponding primary page (252) or a primary object in its database that points to the one or more duplicated portions in its database. The supplemental servers then serve the portions of the client requests that require the one or more of the duplicated portions. As demand for service decreases and the primary server becomes underloaded (404), it automatically restores (406) the primary page or the primary object in its database and resumes serving the entire client requests.

8 Claims, 3 Drawing Sheets

DYNAMIC RECONFIGURATION OF NETWORK SERVERS

TECHNICAL FIELD

This invention relates to information network architecture, such as the Internet or an intranet architecture.

BACKGROUND OF THE INVENTION

In an information network, such as the Internet, user's computers, referred to as clients, request information from information-providers' computers, referred to as servers, and the servers supply the requested information to the clients. In the World Wide Web (WWW), which is a de-facto standard for storing, finding, and transferring information on the Internet, the information is supplied in the form of pages. A page is a display screen-full of information expressed in textual, graphical, scriptural, and/or other form. A page comprises one or more information objects. An object is an information element that has its own network address— preferably a unique single address—called a URL (Uniform Resource Locator). For example, a page may comprise one or more text objects, one or more picture objects, and one or more script objects that are presented on the display screen in a layout defined by a frame object.

Typically, a server has a main page that serves as the entry point to the information and services that the server provides. This page typically points to other pages and to objects (e.g., graphic images, video/audio/text files, etc.), which are typically served by the same server.

Generally, when a client accesses the server, the server provides the main page to the client and then interacts with the client to provide the client with desired additional information and/or services. As increasing numbers of clients access the server, the server's processing load increases and its performance eventually degrades, so that users experience increasing delays between the time at which they place a request to the server and the time at which their request is satisfied by the server.

To avoid overloading of a server, typically an administrator must manually reconfigure the server and redirect some of the requests to other servers in order to lessen the load on the subject server. Some service providers store replicas of the served information in a plurality of servers and have different ones of the servers serve different requests, e.g., on a round-robin basis, thereby spreading the load of requests over multiple servers. This has several disadvantages. Firstly, an administrator's manual intervention is slow, inefficient, prone to error, and often not prompt. Secondly, using a plurality of servers to serve requests on a round-robin basis results in underutilization of the servers during periods when relatively few requests are being made, and hence it is inefficient. Furthermore, it requires all server information to be replicated on each server; the servers cannot take advantage of a common cache for common data.

SUMMARY OF THE INVENTION

This invention is directed to solving these and other problems and disadvantages of the prior art. Generally according to the invention, a portion of the information which a primary server uses to process client requests is replicated on one or more supplemental, stand-by, servers, and as the clients' demand for service increases and the processing load on the primary server becomes excessive, the primary server automatically off-loads the processing of those portions of the client requests that require the replicated portion of the information onto the supplemental servers. As demand for service decreases and the primary server becomes underloaded, preferably the primary server automatically resumes serving the entire client requests.

The advantages of the invention include the following: the load-shedding and load-sharing happen automatically, without human intervention, based on the present processing load. Only one server, or one group of servers, out of the entire server set serves an individual portion of the information (e.g., a page, or an object, or a group of pages or objects) at any one time, which allows for efficient caching of the information. And more uniform response times are provided to clients even as client demand for services varies greatly. Moreover, while a standby server is not serving the primary server's clients, its processing power may be used for other processing activities, such as serving other clients whose demand for service peaks at a time different from the primary server's clients, thereby resulting in efficient server utilization.

According to a first aspect of the invention, a client-server system comprises a plurality of servers for processing client requests, wherein at least one first server of the plurality of servers has first information and second information related to the first information, for processing portions of the client requests that require the first information and portions of the client requests that require the second information. The at least one first server processes both portions of the client requests while the processing load on the at least one server is not excessive, e.g., does not exceed a predetermined first limit. In response to the processing load on the at least one first server becoming excessive, the at least one first server processes the portions of the client requests which require the first information without also processing the portions of the client requests which require the second information, and automatically redirects the portions of the client requests which require the second information to at least one second server for processing. The at least one server of the plurality of servers has the second information and processes the redirected portions of the client requests which require the second information, automatically in response to the redirection. Preferably, the at least one first server automatically ceases redirecting the portions of the client requests that require the second information and resumes processing of both portions of the client requests in response to the processing load on the at least one first server ceasing to be excessive, e.g., falling below a predetermined second limit.

According to a second aspect of the invention, a method of operating a client-server system that includes a plurality of servers for processing client requests comprises the following steps. While a processing load on at least one first server of the plurality of servers is not excessive, the at least one first server processes both portions of client requests that require first information and portions of the client requests that require second information related to the first information; the at least one first server has both the first information and the second information. In response to the processing load on the at least one first server becoming excessive, the at least one server processes the portions of the client requests that require the first information without also processing the portions of the client requests that require the second information, and automatically redirects the portions of the client requests that require the second information to at least one second server of the plurality of servers. In response to the redirection, the at least one second server automatically processes the redirected portions of the client requests that require the second information; the at least one second server has the second information. Preferably, when the processing load on the at least one server falls below a predetermined limit, the at least one server automatically ceases to redirect the portions of the client requests that require the second information and resumes processing both portions of the client requests.

These and other advantages and features of the invention will become more apparent from the following description of an illustrative embodiment of the invention taken together with the drawing.

DETAILED DESCRIPTION

Figure 1:
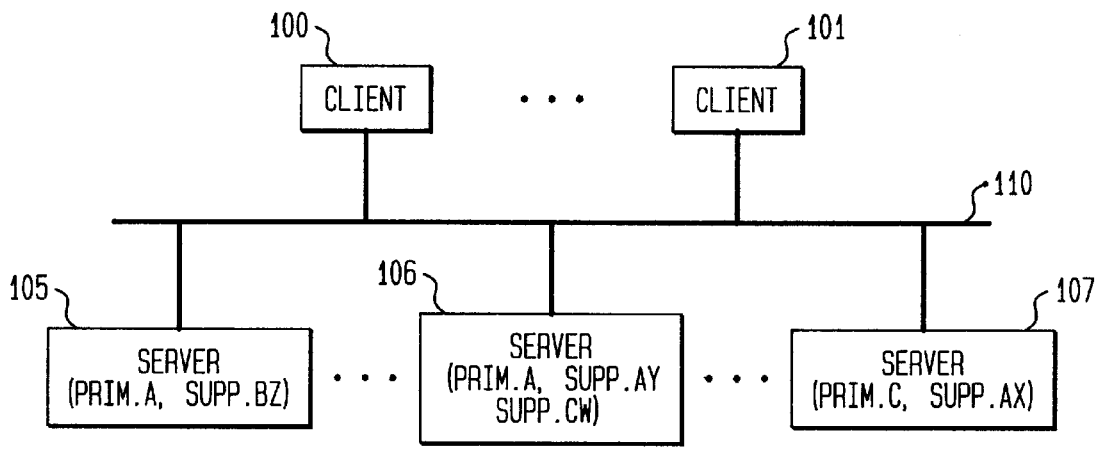
FIG. 1 is a block diagram of an information network that includes an illustrative embodiment of the invention.

FIG. 1 shows an illustrative information network, which in this example is the Internet. It comprises a plurality of clients 100–101 and a plurality of servers 105–107 interconnected by the Internet network fabric 110. Each server 105 is a computer having a processor and a memory, wherein the processor executes control programs stored in the memory to provide services and data stored in the memory. Each server 105–107 is a primary server for a database of information A–C, respectively. According to the invention, however, besides being a primary server for a database, each server 105–107 is also a secondary, or supporting, server for a portion of one or more other servers' databases. In the example of FIG. 1, server 105 is a supplemental server for a portion BZ of server's 106 database B; server 106 is a supplemental server for a portion AY of server's 105 database A and a portion CW of server's 107 database C; and server 107 is a supplemental server for a portion AX of server's 105 database A.

Figure 2:
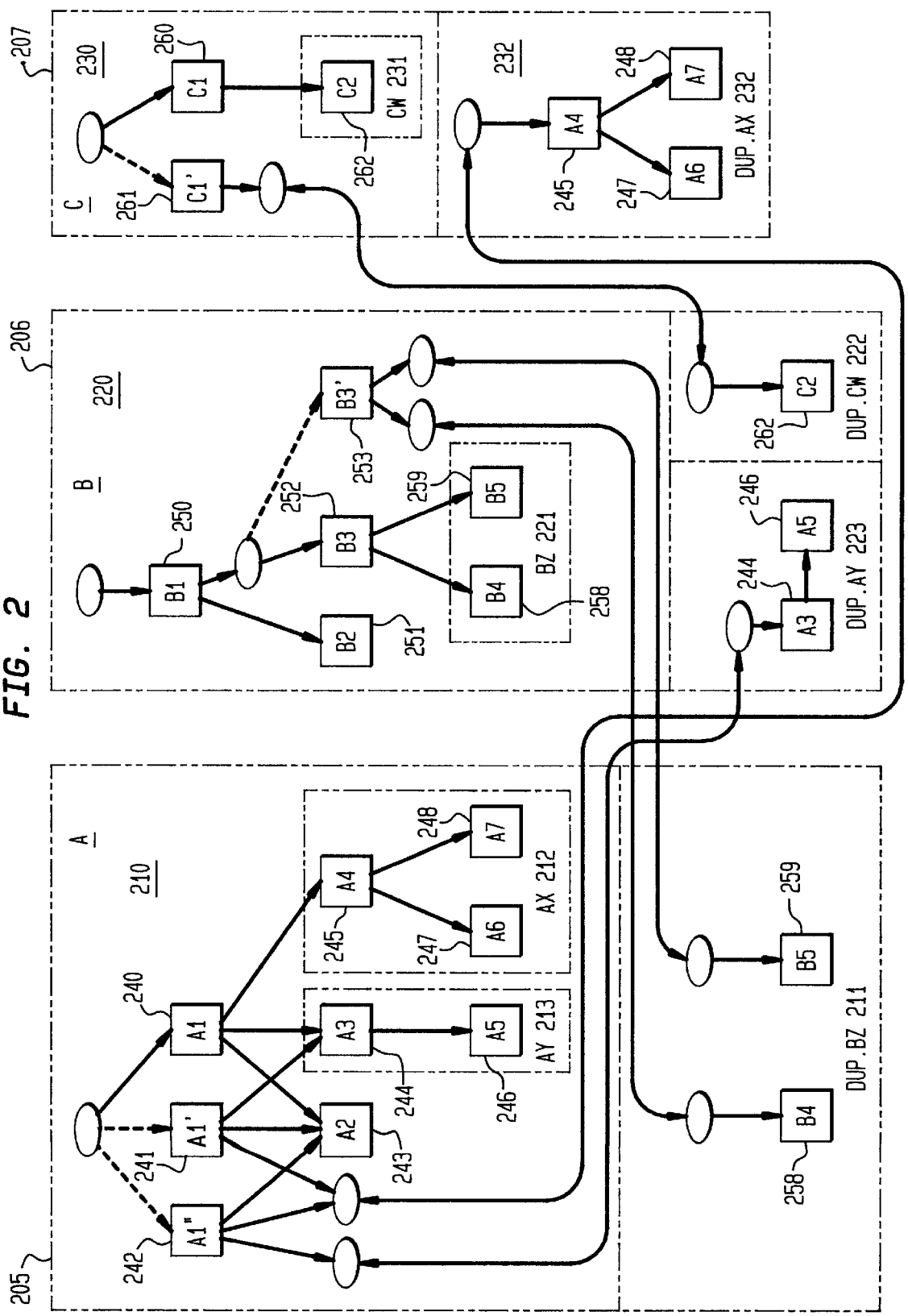
FIG. 2 is a block diagram of partial contents of memories of servers of the information network of FIG. 1.

FIG. 2 shows the data contents of memories 205–207 of servers 105–107, respectively, that are relevant to an understanding of this invention. Memory 205 stores database A 210 and a duplicate 211 of portion BZ 221 of database B 220. Memory 206 stores database B 220, a duplicate 222 of portion CW 231 of database C 230, and a duplicate 223 of portion AY 213 of database A 210. And memory 207 stores database C 230 and a duplicate 232 of portion AX 212 of database A 210.

Database A 210 comprises a primary main page A1 240 that includes links to other pages A2–A4 243–245 in database A 210. Pages A3 244 and A4 245 in turn include links to yet other pages A5 246 and A6–A7 247–248, respectively, in database A 210. Database A 210 further includes a secondary main page A1' 241 that includes links to pages A2–A3 243–244 in database 210, but instead of including a link to page A4 245 of portion AX 212 in memory 205, it includes a link to duplicate page A4 245 of duplicate portion AX 232 in memory 207. Database A 210 yet further includes a tertiary main page A1" 242 that includes a link to page A2 243 in database 210, but instead of including links to pages A3 244 and A4 245 of portions AX 212 and AY 213 in memory 205, it includes links to duplicate pages A3 244 and A4 245 of duplicate portions AY 223 and AX 232, respectively, in memories 206 and 207, respectively.

Database B 220 comprises a main page B1 250 that includes links to an object B2 251 and to another page B3 252 in database B 220. B3 252 is a primary page that in turn includes links to other objects and/or pages B4–B5 258–259 in database B 220. Database B 220 further includes a secondary page B3' 253 which, instead of including links to pages B4–B5 258–259 in portion BZ 221 of database B 220 in memory 206, includes links to duplicate objects and/or pages B4–B5 258–259 of duplicate portion BZ 211 in memory 205.

Database C 230 comprises a primary format-object C1 260 of a main page that includes a link to a data object C2 262 in portion CW 231 of database C 230. Database C 230 further includes a secondary format-object C1' 261 of the main page which, instead of including a link to data object C2 262 in portion CW 231 of database C 230 in memory 207, includes a link to duplicate object C2 262 of duplicate portion CW 222 in memory 206.

It is assumed that servers 105–107 experience their heaviest processing loads at different times. For example, server 105 may be most heavily used in the evenings, server 106 may be most heavily used on workdays, and server 107 may be most heavily used on weekends. Initially, all servers 105–107 operate conventionally. That is, server 105 initially serves all requests for information from database A 210, server 106 initially serves all requests for information from database B 220, and server 107 initially serves all requests for information from database C 230, in a conventional manner, using primary pages and/or objects 240, 252, and 260. As is also conventional, each server 105–107 keeps a record of its present processing load, for example, in the form of a number of accesses (requests) served per unit of time.

Figure 4:
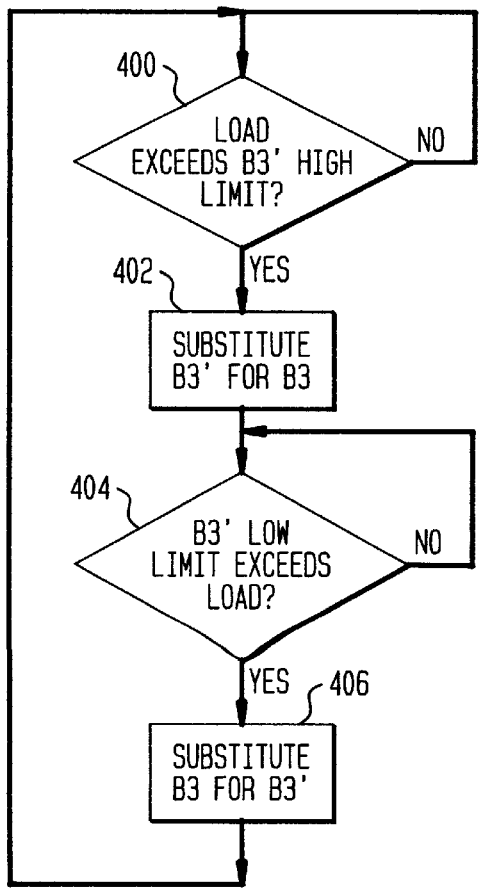
FIGS. 3–5 each are a flow diagram of partial operations of a different one of the servers of the information network of FIG. 1.
Figure 5:
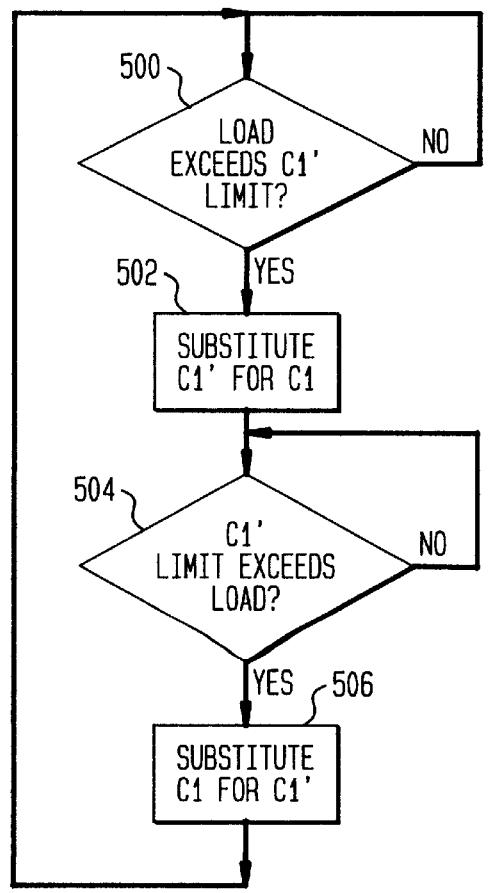
Figure 3:
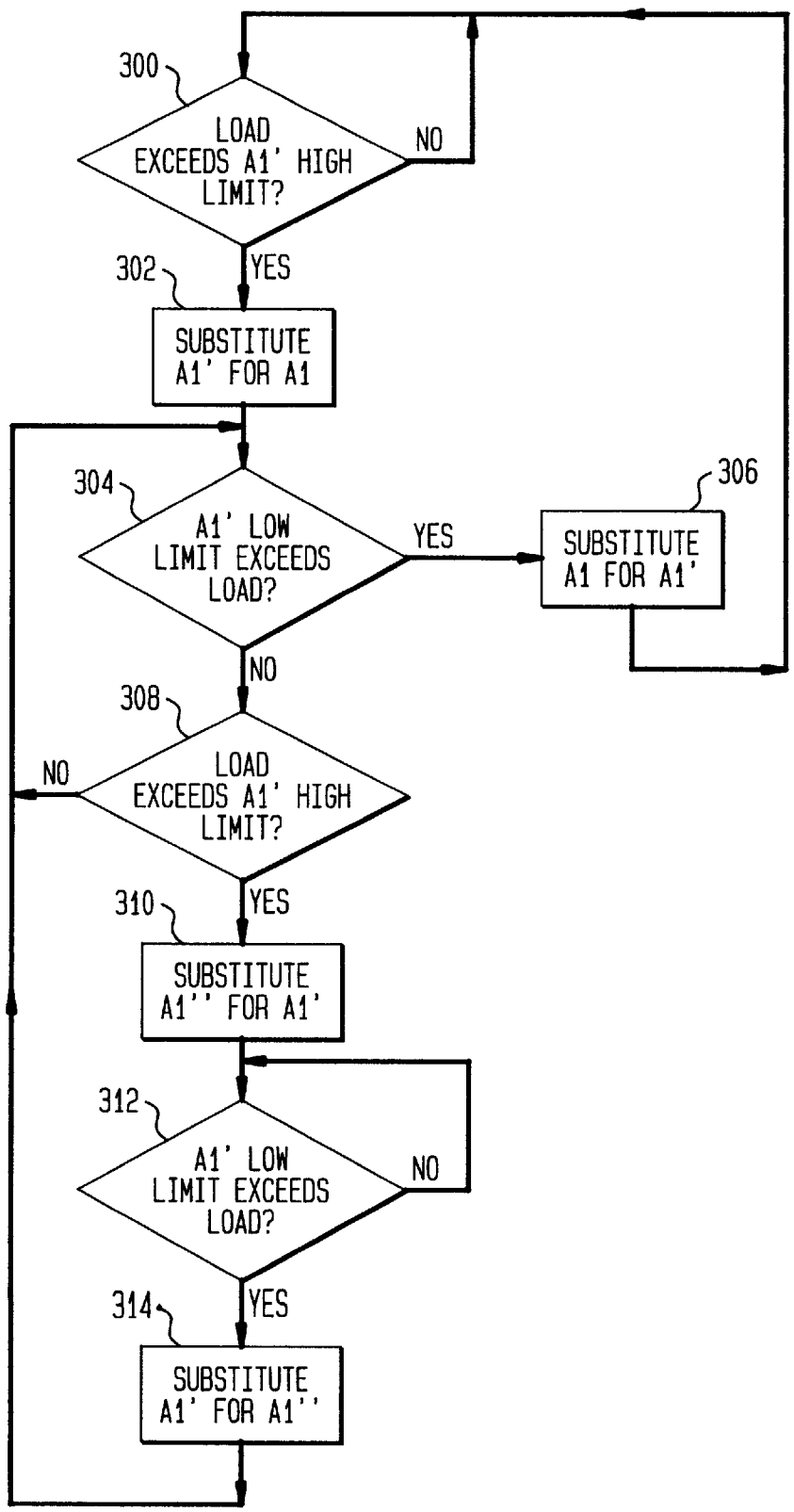

Operations of servers 105–107 that are relevant to an understanding of the invention are diagrammed in FIGS. 3–5, respectively. In addition to its conventional operations, each server 105–107 executes a load-control program that is initialized with predetermined load limits. As shown in FIG. 3, server 105 repeatedly checks if its present processing load exceeds a high-load upper limit "A1' high" at step 300. If not, it means that server 105 is not overloaded, and so server 105 remains at step 300; if so, it means that server 105 is overloaded, and server 105 therefore substitutes secondary page A1' 241 for primary page A1 240, at step 302. This has the effect of causing all subsequent requests for information from portion AX 212 of database A 210 to be directed to server 107. Server 107 serves these requests in a conventional manner from duplicate portion AX 232. Hence, when server 105 becomes overloaded, some of its processing load is taken over by server 107.

Following step 302, server 105 checks if a high-load lower limit "A1' low" exceeds its present processing load, at step 304. If so, it means that server 105 is underloaded, and so server 105 substitutes primary page A1 240 for secondary page A1' 241, at step 306. This has the effect of resuming initial operation, where server 105 is serving all requests for information from database A 210. Server 105 then returns to step 300.

If it is determined at step 304 that limit A1' low does not exceed the present load, server 105 checks whether the present load again exceeds the A1' high limit, at step 308. If not, it means that server 105 is not overloaded, and so server 105 returns to step 304; if so, it means that server 105 is again overloaded, and server 105 therefore substitutes tertiary page A1" 242 for secondary page A1' 241, at step 310. This has the additional effect of causing all subsequent requests for information from portion AY 213 of database A to be directed to server 106. Server 106 serves these requests in a conventional manner from duplicate portion AY 223, thereby taking on some of the processing load that would otherwise have to be done by server 105, and hence reducing the load on server 105.

Following step 310, server 105 checks if the A1' low limit exceeds the present processing load of server 105, at step 312. If not, server 105 remains at step 312; if so, it means that server 105 is underloaded, and server 105 therefore substitutes secondary page A1' 241 for tertiary page A1" 242, at step 314. This has the effect of server 105 taking back the portion of the processing load that had been transferred to server. 106 at step 310. Server 105 then returns to step 304.

The operation of servers 106 and 107 is similar. As shown in FIG. 4, server 106 repeatedly checks if its present processing load exceeds a high-load upper limit "B3' high", at step 400. If not, server 106 is not overloaded and remains at step 400; if so, server 106 is overloaded, and therefore it substitutes secondary page B3' 253 for primary page B3 252, at step 402. This has the effect of causing all subsequent requests for information from portion BZ 221 of database B 220 to be directed to server 105. Server 105 serves these requests in a conventional manner from duplicate portion BZ 211, thereby relieving the load on server 106.

Following step 402, server 106 checks if a high-load lower limit "B3' low" exceeds its present processing load at step 404. If not, server 106 remains at step 404; if so, it means that server 106 is underloaded, and therefore server 106 substitutes primary page B3 252 for secondary page B3' 253, at step 406. This has the effect of resuming initial operation, where server 106 is serving all requests from database B220. Server 106 then returns to step 400.

As shown in FIG. 5, server 107 repeatedly checks if its present processing load exceeds a load limit "C1", at step 500. If not, server 107 is not overloaded and remains at step 500; if so, server 107 is overloaded, and therefore it substitutes secondary object C1' 261 for primary object C1 260, at step 502, thereby transferring some of its processing load to server 190 106. Following step 502, server 107 repeatedly checks if the load limit "C1'" exceeds its present processing load, at step 504. If not, server 107 remains at step 504; if so, it means that server 107 is no longer overloaded, and therefore server 107 substitutes primary object C1 260 for secondary object C1' 261, at step 506, thereby resuming its initial operation. Server 107 then returns to step 500.

Of course, various changes and modifications to the illustrative embodiment described above will be apparent to those skilled in the art. For example, instead of storing both primary and secondary pages or objects, the primary pages or objects can be converted into the secondary pages or objects "on-the-fly" (e.g., in real time), and vice versa. Likewise, instead of duplicate portions of the database being pre-stored on supplemental servers, the database portions may be duplicated and distributed to the supplemental servers "on-the-fly." Moreover, measurements and limits other than the number of accesses per unit of time can be used to determine whether to off-load or return processing from or to the primary server. These measurements and limits can be forward-looking, such as predictive algorithms which estimate future load based on load experienced at a similar time in the past. Furthermore, the main server can request present processing load data from the stand-by servers and incorporate these data into its decision of whether to offload processing to those stand-by servers. Such changes and modifications can be made without departing from the spirit and the scope of the invention and without diminishing its attendant advantages. It is therefore intended that such changes and modifications be covered by the following claims.

The invention claimed is:

1. A client-server system comprising:

a plurality of servers for processing client requests;

at least one first server of the plurality of servers having first information and further having second information related to the first information, for processing client requests for the first information by sending to the clients the first information along with a first link to the second information that causes client requests for the second information to be directed to the at least one first server and further processing client requests directed to the at least one first server for the second information by sending to the clients the second information of the at least one first server, while a processing load on the at least one first server is not excessive, and for processing the client requests for the first information by sending to the clients the first information along with a second link to the second information that causes the client requests for the second information to be redirected to the at least one second server for processing, in response to the processing load on the at least one first server becoming excessive; and the at least one second server of the plurality of servers also having the second information, for processing the client requests redirected to the at least one second server for the second information by sending to the clients the second information of the at least one second server, automatically in response to the redirection.

2. The system of claim 1 wherein:

the at least one second server has the second information but does not have the first information, for processing the redirected client requests for the second information but not for processing the client requests for the first information.

3. The system of claim 1 wherein:

the first information includes a primary page or object including the first link that points to the second information of the at least one first server while the processing load on the at least one first server is not excessive, and includes a secondary page or object including the second link that points to the second information of the at least one second server in response to the processing load on the at least one first server becoming excessive.

4. The system of claim 2 wherein:

the at least one first server processes both client requests while the processing load on the at least one first server does not exceed a predetermined limit, and processes the client requests for the first information without also processing the client requests for the second information and causes the client requests for the second information to be redirected to the at least one second server in response to the processing load on the at least one first server exceeding the predetermined limit.

5. The system of claim 4 wherein:

said predetermined limit is a first predetermined first limit, and the at least one first server automatically ceases redirecting the client requests for the second information and resumes processing of both client requests in response to the processing load on the at least one first server falling below a predetermined second limit.

6. The system of claim 1 wherein:

the at least one first server further has third information related to the first information, processes the client requests for the first information by sending to the clients the first information along with the first link and a third link to the third information that causes client requests for the third information to be directed to the at least one first server, processes the client requests for the second information by sending to the clients the second information of the first server, and processes client requests for the third information by sending to the clients the third information of the first server while the processing load on the at least one server does not exceed a predetermined first limit, processes the client requests for the first information by sending to the clients the first information along with the second link and the third link, and processes the client requests for the third information by sending to the clients the third information of the at least one first server in response to the processing load on the at least one first server exceeding the predetermined first limit for a first time, and processes the client requests for the first information by sending to the clients the first information along with the second link and a fourth link to the third information that causes the client requests for the third information be redirected to at least one third server of the plurality of servers for processing, in response to the processing load on the at least one first server exceeding the predetermined first limit for a second consecutive time;

the at least one third server of the plurality of servers also has the third information, for processing the client requests for the third information redirected to the at least one third server by sending to the clients the third information of the at least one third server upon the processing load on the at least one first server exceeding the predetermined first limit for the second consecutive time; and the at least one first server further automatically ceases causing redirection and resumes processing of the client requests for one of the second and the third information in response to the processing load on the at least one first server falling below a predetermined second limit for a first time, and automatically ceases causing redirection and resumes processing of the client requests for another of the second and the third information in response to the processing load on the at least one first server falling below the predetermined second limit for a second consecutive time.

7. A method of operating a client-server system that comprises a plurality of servers for processing client requests, comprising the steps of:

processing client requests for first information by sending to the clients the first information along with a first link to second information that causes client requests for the second information to be directed to at least one first server, and processing client requests directed to the at least one first server for the second information related to the first information by sending to the clients the second information of the at least one server, in the at least one first server of the plurality of servers, which at least one first server has both the first information and the second information, while a processing load on the at least one first server is not excessive;

processing the client requests for the first information in the at least one first server by sending to the clients the first information along with a second link to the second information that causes the client requests for the second information to be redirected to at least one second server of the plurality of servers, which at least one second server also has the second information, in response to the processing load on the at least one first server becoming excessive; and automatically processing the client requests redirected to the at least one second server for the second information in the at least one second server by sending to the clients the second information of the at least one second server, in response to the redirection.

8. The method of claim 7 further comprising the steps of:

automatically ceasing to redirect the client requests for the second information in response to the processing load on the at least one first server falling below a predetermined level; and automatically resuming processing of both client requests in the at least one server, in response to the processing load on the at least one first server falling below the predetermined level.

* * * * *